United States Patent
Watremetz et al.

(10) Patent No.: US 9,297,590 B2
(45) Date of Patent: Mar. 29, 2016

(54) REGENERATOR

(75) Inventors: Benoît Watremetz, Merindol (FR);
Claude Jacquot, Caumont sur Durance (FR); Daniel C. Sherman, Hudson, OH (US); Hassan S. Niknafs, Stow, OH (US); Thomas Szymanski, Hudson, OH (US); John Stewart Reid, Wooster, OH (US)

(73) Assignee: SAINT-GOBAIN CENTRE DE RECHERCHES ET D'ETUDES EUROPEEN, Courbevoie (FR)

( * ) Notice: Subject to any disclaimer, the term of this patent is extended or adjusted under 35 U.S.C. 154(b) by 0 days.

(21) Appl. No.: 14/131,287

(22) PCT Filed: Jul. 6, 2012

(86) PCT No.: PCT/IB2012/053484
§ 371 (c)(1),
(2), (4) Date: Feb. 18, 2014

(87) PCT Pub. No.: WO2013/005196
PCT Pub. Date: Jan. 10, 2013

(65) Prior Publication Data
US 2014/0158318 A1    Jun. 12, 2014

(30) Foreign Application Priority Data

Jul. 7, 2011 (FR) .................. 11 56188
Mar. 15, 2012 (FR) .................. 12 52371

(51) Int. Cl.
*C04B 35/00* (2006.01)
*F28D 20/00* (2006.01)
(Continued)

(52) U.S. Cl.
CPC ........ *F28D 20/0056* (2013.01); *C04B 33/1322* (2013.01); *C04B 35/195* (2013.01);
(Continued)

(58) Field of Classification Search
CPC .................. C04B 2235/3217; C04B 35/505; C23C 14/3414
USPC ........................................... 501/126
See application file for complete search history.

(56) References Cited

U.S. PATENT DOCUMENTS 3,381,113 A * 4/1968 Keith et al. ............... 392/346
3,989,927 A * 11/1976 Erb ............................ 392/344
(Continued)

FOREIGN PATENT DOCUMENTS

CN    1443274 A     9/2003
DE    36 17 904    12/1987
(Continued)

OTHER PUBLICATIONS

Rane et al. Dielectric behaviour of MgFe2O4 prepared from chemically beneficiated iron ore rejects. Bull. Mater. Sci., vol. 24, No. 3, Jun. 2001, pp. 323-330.*
(Continued)

*Primary Examiner* — Noah Wiese
(74) *Attorney, Agent, or Firm* — Oliff PLC

(57) ABSTRACT

The present invention relates to a regenerator including a packed bed of energy storage elements made of a material having the following chemical analysis: 25%<$Fe_2O_3$<90%, 5%<$Al_2O_3$<30%, CaO<20%, $TiO_2$<25%, 3%<$SiO_2$<50%, $Na_2O$<10%, $Fe_2O_3+Al_2O_3+CaO+TiO_2+SiO_2+Na_2O$>80%, and other compounds: complement to 100%.

31 Claims, 6 Drawing Sheets

(51) Int. Cl.
- *C04B 33/132* (2006.01)
- *C04B 35/195* (2006.01)
- *C04B 35/26* (2006.01)
- *F28D 17/00* (2006.01)
- *F28D 17/02* (2006.01)

(52) U.S. Cl.
CPC .......... C04B35/2683 (2013.01); F28D 17/005 (2013.01); F28D 17/02 (2013.01); *C04B 2235/3201* (2013.01); *C04B 2235/3208* (2013.01); *C04B 2235/3217* (2013.01); *C04B 2235/3232* (2013.01); *C04B 2235/3272* (2013.01); *C04B 2235/3418* (2013.01); *C04B 2235/5436* (2013.01); *C04B 2235/77* (2013.01); *C04B 2235/9692* (2013.01)

(56) References Cited

U.S. PATENT DOCUMENTS

| | | | |
|---|---|---|---|
| 4,132,005 A * | 1/1979 | Coulaloglou | 34/360 |
| 4,316,965 A | 2/1982 | Oda et al. | |
| 4,598,054 A | 7/1986 | Mochida et al. | |
| 4,651,810 A * | 3/1987 | Triessnig | 165/9.2 |
| 5,084,093 A * | 1/1992 | Yamaoka et al. | 75/529 |
| 6,699,562 B2 | 3/2004 | Niknafs et al. | |
| 6,889,963 B2 | 5/2005 | Niknafs et al. | |
| 2002/0190246 A1 | 12/2002 | Bartha | |
| 2011/0100583 A1 | 5/2011 | Freund et al. | |
| 2011/0113777 A1 | 5/2011 | De Amicis et al. | |
| 2012/0085087 A1 | 4/2012 | Canal et al. | |

FOREIGN PATENT DOCUMENTS

| | | |
|---|---|---|
| DE | 10 2004 042 742 A1 | 3/2006 |
| EP | 0794161 A1 | 9/1997 |
| FR | 2390390 A1 | 12/1978 |
| FR | 2 947 015 | 12/2010 |
| WO | 97/11041 A1 | 3/1997 |
| WO | 98/48223 A1 | 10/1998 |
| WO | WO 2004/063652 A2 | 7/2004 |

OTHER PUBLICATIONS

Singh et al; "A review on packed bed solar energy storage systems;" Renewable and Sustainable Energy Reviews; 2010; vol. 14; pp. 1059-1069.

Voisin; "Métallurgie extractive de l'aluminum [Extractive metallurgy of aluminum];" Techniques de l'Ingenieur [Technical Engineer]; Jan. 10, 1992; pp. M2 340-1-M2 340-22.

Nov. 21, 2012 International Search Report issued in International Patent Application No. PCT/IB2012/053484.

Nov. 21, 2012 Written Opinion issued in International Patent Application No. PCT/IB2012/053484.

Feb. 22, 2012 Search Report issued in French Patent Application No. 11 56188 (with translation).

Jul. 7, 2011 Written Opinion issued in French Patent Application No. 11 56188 (with machine translation).

Jun. 11, 2015 Office Action issued in Chinese Application No. 2012800335413.

Sep. 9, 2015 European Communication issued in European Application No. 12750485.0.

* cited by examiner

REGENERATOR

TECHNICAL FIELD

The invention relates to a heat storage regenerator, and a heat installation comprising such a regenerator.

TECHNOLOGICAL BACKGROUND

The storage of energy, for example heat-generating energy, makes it possible to stagger the production and the consumption of that energy in time.

The storage of heat-generating energy is also useful for upgrading soft energies, such as solar energy, which are renewable but whose production is intermittent. The storage of the energy can also be useful to exploit the electricity price differences between the so-called "off-peak" hours during which the electricity tariffs are lowest, and the so-called "peak" hours during which the tariffs are highest. For example, in the case of energy storage by air compression, generating heat-generating energy which is stored in a heat regenerator, the compression phases consuming electricity are advantageously performed at lower cost during the off-peak hours, whereas the expansion phases producing electricity are performed during the peak hours, in order to provide electricity which can be injected into the electricity network, according to demand, at an advantageous tariff.

The heat-generating energy is conventionally stored in a packed bed of energy storage elements, or "media", of a regenerator, for example in a packed bed of pebbles.

The storage operation, based on heat exchange between a current of heat-generating fluid and the regenerator, is conventionally called the "charge", the heat-generating fluid entering into the generator at the time of the charge being called "charge heat-generating fluid".

The transfer of heat-generating energy can result in an increase in the temperature of these energy storage elements (storage of "sensible" heat) and/or to a change of state of these elements (storage of "latent" heat).

The stored heat-generating energy can then be recovered, by heat exchange between a current of heat-transfer fluid and the energy storage elements. This operation is conventionally called "discharge", the heat-generating fluid entering into the regenerator at the time of the discharge being called "discharge heat-generating fluid".

"A review on packed bed solar energy storage systems", Renewable and Sustainable Energy Reviews, 14 (2010), p 1059-1069 describes the state of the art in the field of regenerators.

U.S. Pat. No. 4,651,810 describes a glass furnace regenerator comprising energy storage elements obtained from chromium ore. DE 36 17 904 provides a composition for a chromium ore: between 1% and 6% of $SiO_2$, between 0.3% and 0.4% of CaO, between 13.6% and 29.6% of $Fe_2O_3$ and between 8.7% and 28.9% of $Al_2O_3$.

WO 2004/063652 describes an insulating brick for an industrial furnace made of a material comprising 50% iron oxide.

None of these documents describes a regenerator comprising a packed bed of energy storage elements made of a material having the characteristic: $Fe_2O_3+Al_2O_3+CaO+TiO_2+SiO_2+Na_2O>80\%$.

When a regenerator is operating, and in particular when the heat-transfer fluid is moist air, the condensates from the moisture of the air corrode the materials of the regenerator. What is more, at high pressures, the water present in the air may condense and mix with the other condensates or pollutants that are present. The latter can thus render the water acid and therefore corrosive. The result of this is a considerable reduction in the life of the regenerator, which should be greater than 20 years, even greater than 30 years in industrial installations, and therefore an increase in the overall cost.

There is therefore a need to increase the life of the regenerators, particularly with regard to corrosive acid attacks, in particular at operating temperatures greater than 350° C., even greater than 500° C., and in particular for regenerators charged with moist air.

One aim of the invention is to at least partially satisfy this requirement.

SUMMARY OF THE INVENTION

This aim is achieved by means of a regenerator, in particular a sensible-heat regenerator, comprising a packed bed of energy storage elements made of a material having the following chemical analysis, as percentages by weight:

25%<$Fe_2O_3$<90%, preferably $Fe_2O_3$<70%, and
5%<$Al_2O_3$<30%, and
CaO<20%, and
$TiO_2$<25%, and
3%<$SiO_2$<50%, and
$Na_2O$<10%, and
$Fe_2O_3+Al_2O_3+CaO+TiO_2+SiO_2+Na_2O$>80%, and
other compounds: complement to 100%.

The inventors have found that a regenerator according to the invention offers remarkable efficiency.

Surprisingly, the inventors have also found that the energy storage elements are particularly resistant to acid water, which makes them well suited to the applications, according to the invention, in which they are required to come into contact with acid liquids.

A regenerator according to the invention may also have one or more of the following optional characteristics:

- said material has a content of $Fe_2O_3$, preferably greater than 30%, preferably greater than 35%, preferably greater than 40%, even greater than 45%, even greater than 50%, and/or less than 85%, even less than 80%, even less than 75%, even less than or equal to 70%, even less than 65%, even less than 60%;
- said material has a content of $Al_2O_3$ preferably less than 25%, preferably less than 20%;
- in one embodiment, in particular when said material is manufactured from a starting charge comprising a red mud, said material has a content of CaO preferably greater than 3%, even greater than 5%, even greater than 10%;
- in one embodiment, said material has a content of CaO preferably less than 5%, even less than 3%, even less than 1%;
- in one embodiment, said material has a content of $TiO_2$ preferably greater than 5%, even greater than 10%, in particular when said material is manufactured from a starting charge comprising a red mud and/or preferably less than 20%, preferably less than 15%;
- in one embodiment, said material has a content of $TiO_2$ preferably less than 5%, even less than 3%, even less than 1%;
- said material has a content of $SiO_2$ preferably greater than 5%, even greater than 8%, and/or less than 40%, even less than 30%, even less than 20%, even less than 15%;
- said material has a content of $Na_2O$ preferably less than 5%;

said material has $Fe_2O_3+Al_2O_3+CaO+TiO_2+SiO_2+Na_2O$ preferably greater than 85%, even greater than 90%, even greater than 95%;

said material has a sum of the contents by weight of $Fe_2O_3$, $Al_2O_3$ and $SiO_2$, $Fe_2O_3+Al_2O_3+SiO_2$, preferably greater than 50%, preferably greater than 60%, even greater than 70%, even greater than 75%, even greater than 80%, even greater than 85%;

said material has a sum of the contents by weight of $Fe_2O_3$ and $Al_2O_3$, $Fe_2O_3+Al_2O_3$, preferably greater than 40%, preferably greater than 50 greater than 60%, even greater than 70%, even greater than 80%, even greater than 90%;

said material has a content of $Fe_2O_3$, on the basis of the sum of the contents by weight of $Fe_2O_3$, $Al_2O_3$ and $SiO_2$, $Fe_2O_3+Al_2O_3+SiO_2$, preferably greater than 45%, preferably greater than 50%, even greater than 60%, even greater than 70%, even greater than 80%, even greater than 90%;

preferably, the "other compounds" consist for more than 90%, preferably for more than 95%, of oxides;

preferably, MgO, $K_2O$, $P_2O_5$ and their mixtures represent more than 90%, more than 95%, even substantially 100% of the other compounds;

said material has an open porosity greater than 0.5%, even greater than 1%, even greater than 5%, and/or less than 30%, preferably less than 25%, even less than 20%, even less than 15%, even less than 10%, even less than 6%;

the energy storage elements are sintered products.

Preferably, said material incorporates alumina production residues, notably from the Bayer method, this method being notably described in "Les techniques de l'ingénieur" [Technology of the engineer], in the article "métallurgie extractive de l'aluminium" [aluminium extraction metallurgy], référence M2340, editions T.I., published 10 Jan. 1992 (in particular chapter 6 beginning at page M2340-13 and FIG. 7 on page M2340-15).

Preferably, the energy storage elements are obtained by sintering a preform resulting from the shaping of a starting charge phase comprising more than 10%, preferably more than 30%, preferably more than 50%, preferably more than 60%, preferably more than 70%, preferably more than 80% of red mud, as a percentage of dry material, obtained from the implementation of a Bayer method, as a percentage by weight on the basis of the starting charge. Said red mud may possibly be converted before use, for example in washing and/or drying steps.

The invention also relates to a heat installation comprising:
  a unit producing heat-generating energy, for example a furnace, a solar tower, a compressor, and
  a regenerator according to the invention, and
  a circulation device ensuring, during a charge phase, the circulation of a charge heat-transfer fluid from the unit producing heat-generating energy to the regenerator, then through said regenerator.

In one embodiment, the energy storage elements are in contact, permanent or temporary, with an acid liquid with a pH value less than 6, even less than 5.5, even less than 5, even less than 4.5, even less than 4, notably aqueous. The invention is in fact particular advantageous in these conditions.

The temperature of the heat-transfer fluid entering into the regenerator at the time of the charge is preferably less than 1000° C., even less than 800° C. and/or preferably greater than 350° C., even greater than 500° C.

The heat installation may notably be a unit producing more than 50 kW, or more than 100 kW, even more than 300 kW, even more than 1 MW, even more than 5 MW of heat-generating energy.

Preferably, the regenerator is a sensible heat regenerator, which means that the material of the energy storage elements and the charge and discharge temperatures are determined in such a way that the energy storage elements remain solid during the operation of the heat installation. It is in fact in a sensible heat regenerator that the probabilities of condensation of the heat-transfer fluid are greatest.

Preferably, a heat installation according to the invention comprises a heat-generating energy consumer, said circulation device ensuring, during a discharge phase, a circulation of a discharge heat-transfer fluid through said regenerator, then from said regenerator to the heat-generating energy consumer.

In one embodiment, the unit producing heat-generating energy comprises, or even consists of, a compressor powered mechanically or electrically by an incineration plant or electricity power station, in particular a heating, solar energy, wind energy, hydroelectric power or tidal energy power station.

The unit producing heat-generating energy and/or the heat-generating energy consumer may comprise a heat exchanger suitable for ensuring a heat exchange, direct or indirect, with the regenerator.

In one embodiment, the circulation device ensures
  during a charge phase, the circulation of a charge heat-transfer fluid from the unit producing heat-generating energy to the regenerator, then through said regenerator, said charge heat-transfer fluid entering into said regenerator at a charge temperature Tc, and
  during a discharge phase, a circulation of a discharge heat-transfer fluid through said regenerator, the discharge heat-transfer fluid entering into said regenerator at a discharge temperature Td, and the energy storage elements are made of a material that has a melting point greater than Tc+50° C. and less than 2000° C., the concentration of all of the elements leached from said material in response to the test described in the standard EN 12457-2 dated December 2002 being less than or equal to 0.5 g/l, and said material of the energy storage elements exhibiting a characteristic ratio A greater than 0.3, with:

$$A=(Cp(Tc)-Cp(Td))/Cp(Td)$$

in which
  Cp(Tc) is the heat-generating capacity of said material at the charge temperature, and
  Cp(Td) is the heat-generating capacity of said material at the discharge temperature.

Preferably, the characteristic ratio is greater than 0.35, preferably greater than 0.40, preferably greater than 0.45, and/or is less than 0.60.

Preferably, the material has a melting point more than 100° C., more than 150° C., even more than 200° C. greater than the charge temperature. Preferably, the material has a melting point less than 1950° C., less than 1900° C., even less than 1800° C., and/or a concentration of all the elements leached from said material, measured according to the standard EN 12457-2 less than or equal to 0.1 g/l, preferably less than or equal to 0.05 g/l.

BRIEF DESCRIPTION OF THE FIGURES

Other objects, aspects, properties and advantages of the present invention will also emerge in the light of the description and of the examples that follow and on studying the appended drawing in which.

Figure 1:
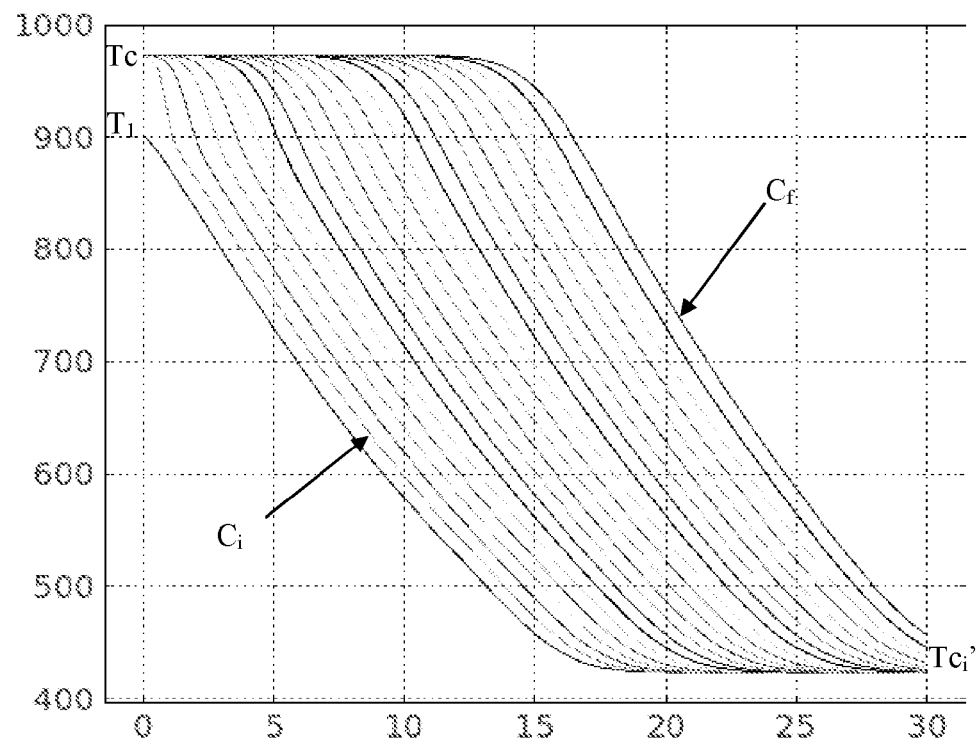
FIG. 1 represents curves of the trend of the temperature of the charge heat-transfer fluid along its path in a regenerator, depending on the length of the regenerator. These curves are considered to be substantially identical at the temperature of the storage elements according to said length of the regenerator. The curve $C_i$ is the curve obtained at the start of charge and the curve $C_f$ is the curve obtained at the end of charge. The length of the regenerator, in meters, is given on the x-axis and the temperature of the charge heat-transfer fluid, in this case air, on the y-axis, in Kelvin.
Figure 2:
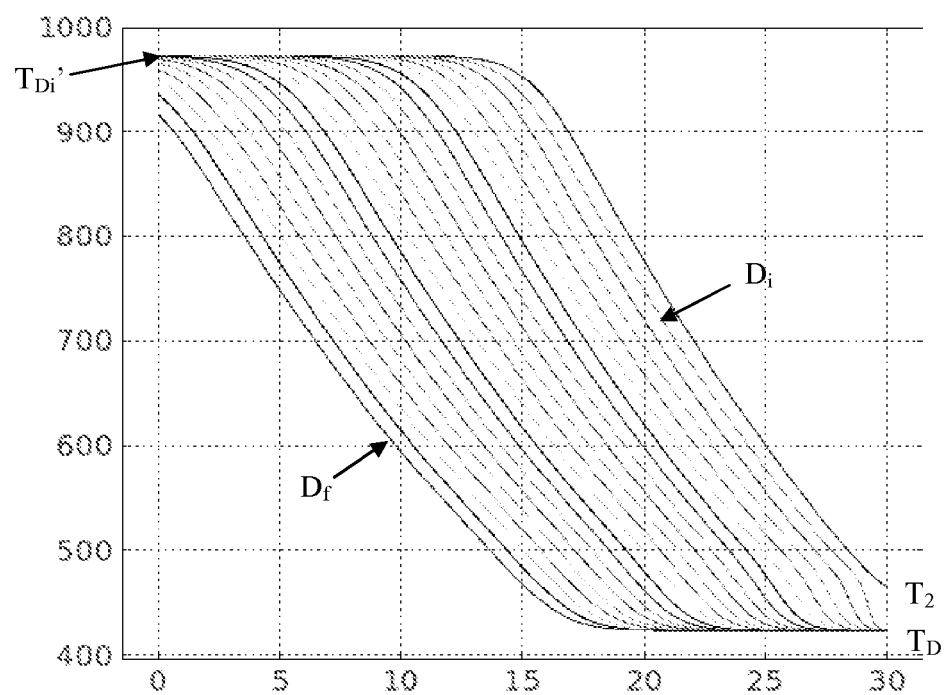
FIG. 2 represents curves of the trend of the temperature of the discharge heat-transfer fluid along its path in a regenerator, according to the length of the regenerator. These curves are considered to be substantially identical at the temperature of the storage elements according to said length of the regenerator. The curve $D_i$ is the curve obtained at the start of discharge and the curve $D_f$ is the curve obtained at the end of discharge. The length of the regenerator, in meters, is given on the x-axis and the temperature of the discharge heat-transfer fluid, in this case air, on the y-axis, in Kelvin.

For FIGS. 1 and 2, the calculations were carried out for a regenerator having a length of 30 m and a diameter of 5 m, the charge phase and the discharge phase lasting 10 800 seconds.

Figure 3A:
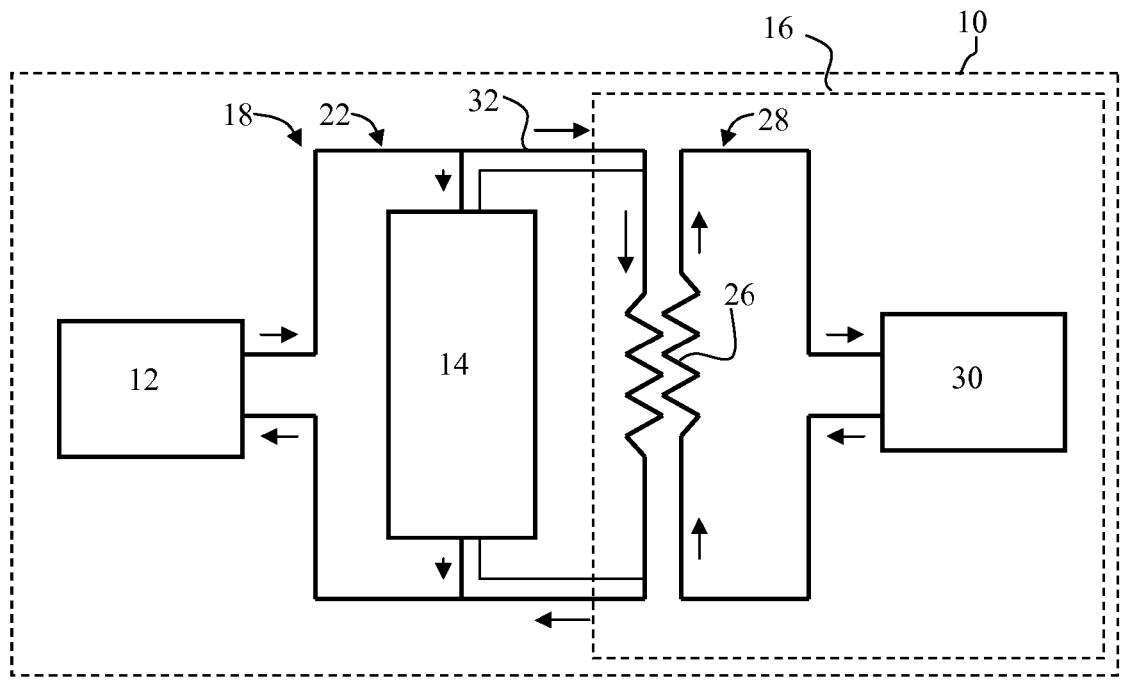
FIGS. 3a and 3b, 4a and 4b, 5a and 5b schematically represent heat installations according to the invention.
Figure 3B:
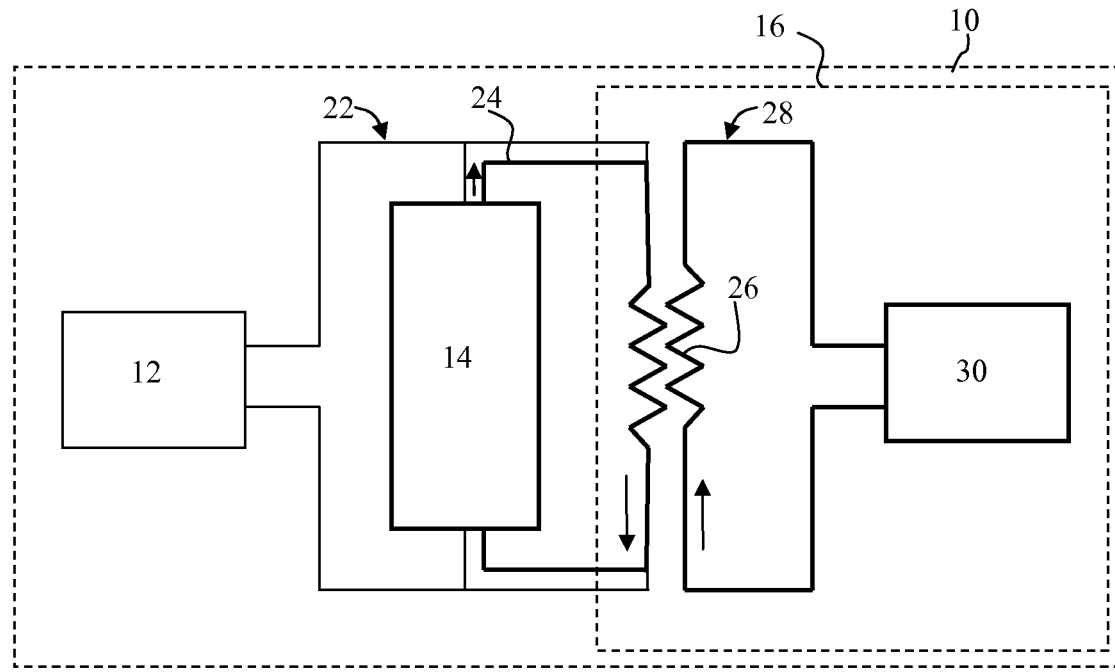
Figure 4A:
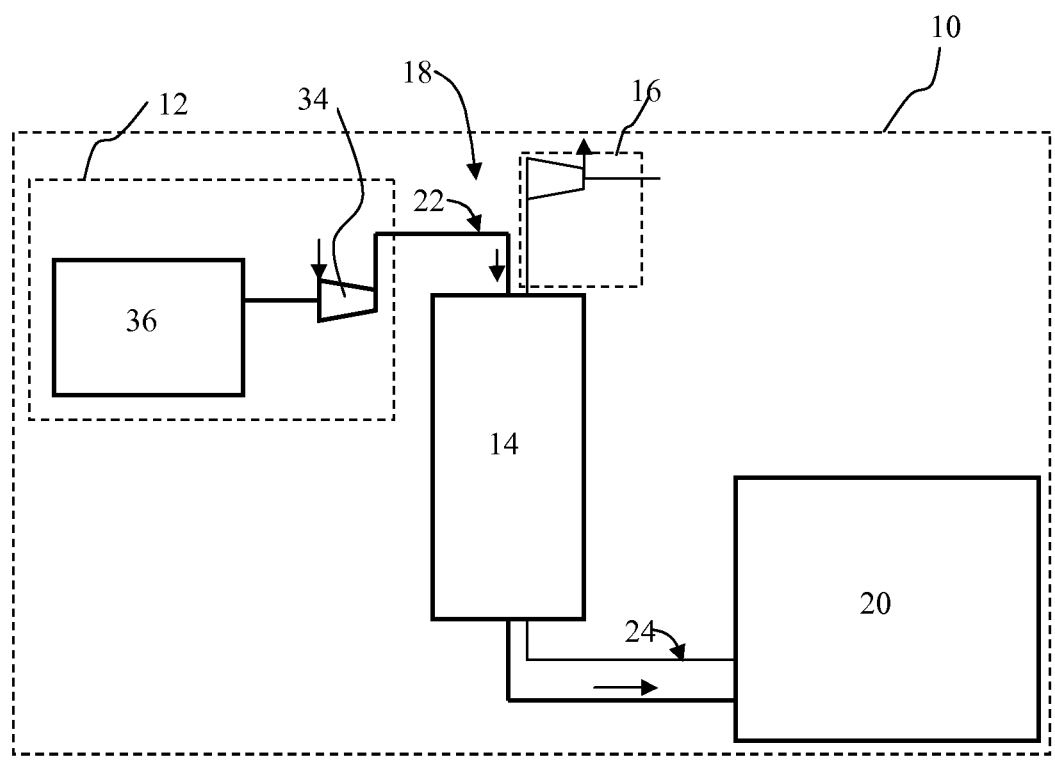
Figure 4B:
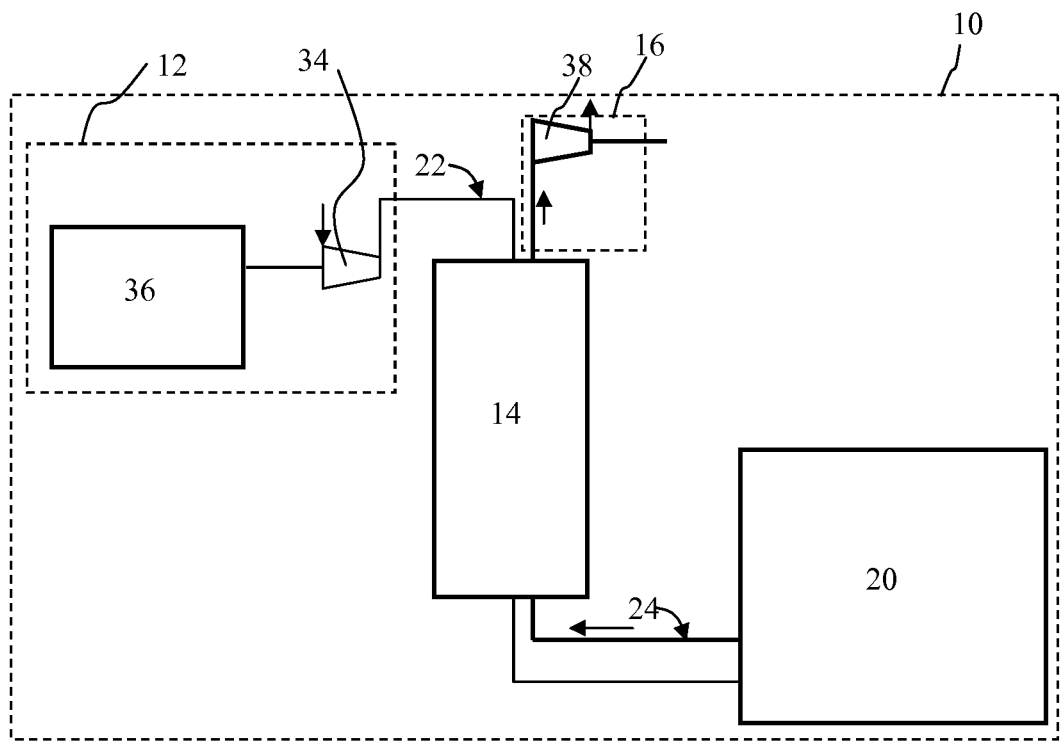
Figure 5A:
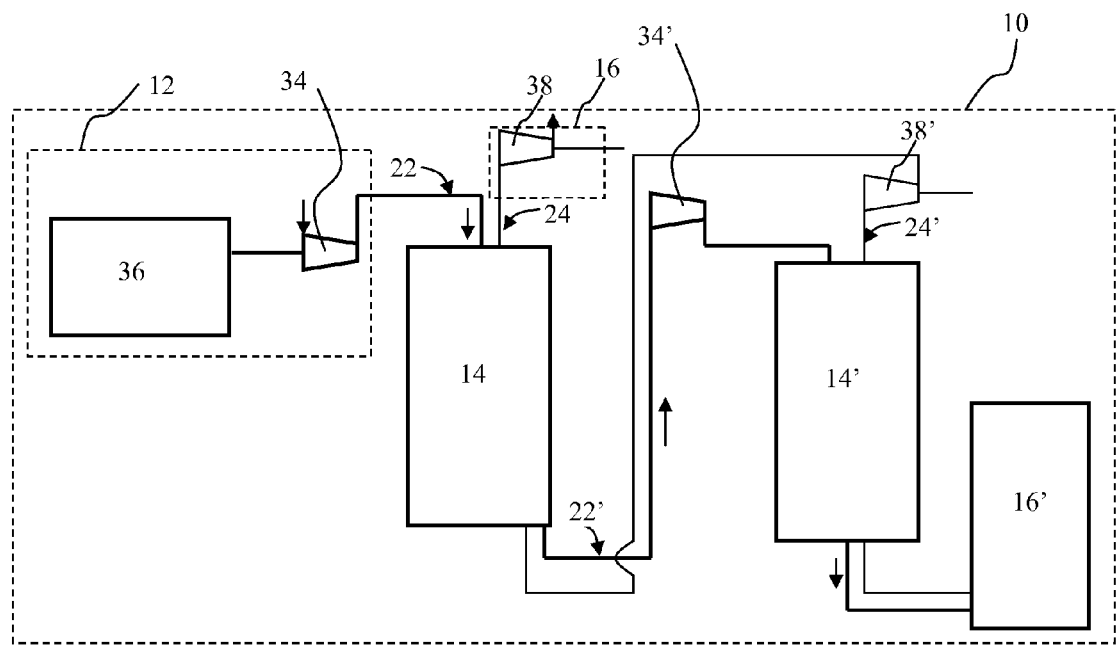
Figure 5B:
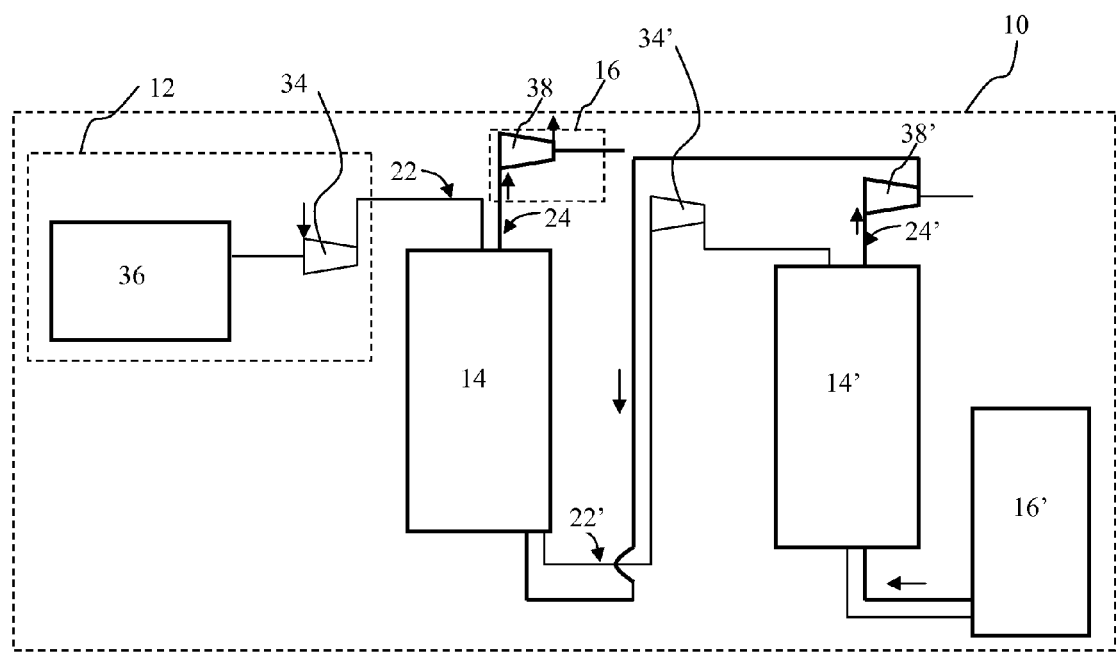

FIGS. 3a, 4a and 5a correspond to charge phases. FIGS. 3b, 4b and 5b correspond to discharge phases. The pipes that are passed through by a fluid are represented with a thicker line. The valves needed for modifying the circulation in the different circuits have not been represented.

In the different figures, identical references are used to designate identical or similar units.

DEFINITIONS

The expression "unit producing heat-generating energy" should be considered to mean not only the units which are specifically designed to generate heat-generating energy, such as a solar tower, but also the units which, through their operation, generate heat-generating energy, for example a compressor.

The term "heat installation" should also be understood in the wide sense, to mean any installation comprising a unit producing heat-generating energy.

The term "heat-generating energy consumer" designates an element capable of receiving heat-generating energy. This may notably result in an increase in the temperature of the consumer (for example in the case of the heating of a building) and/or a conversion into mechanical energy (for example in a gas turbine).

In the present description, in the interests of clarity, the expressions "charge heat-transfer fluid" and "discharge heat-transfer fluid" are used to denote the heat-transfer fluid circulating in the regenerator during the charge and during the discharge, respectively. The charge heat-transfer fluid is said to be "cooled" when it leaves the regenerator. The discharge heat-transfer fluid is said to be "reheated" when it leaves the regenerator.

The expression "packed bed" of energy storage elements should be understood to mean a set of such elements at least partly superposed on one another.

The term "preform" is conventionally used to mean a set of particulates linked by means of a binder, generally temporary, and whose microstructure will change during sintering.

The term "sintering" is used to denote a heat treatment by which the particles of a preform are converted to form a matrix that binds other particles of said perform between them.

For clarity, the term "red mud" is used to denote the liquid or pasty by-product deriving from an alumina manufacturing method and the corresponding dried product.

The oxide contents relate to the overall contents for each of the corresponding chemical elements, expressed in the form of the most stable oxide, according to the usual convention of the industry.

Unless stated otherwise, all the percentages are percentages by weight.

The expressions "containing a", "comprising a" and "including a", should be understood to mean "including at least one", unless stated otherwise.

DETAILED DESCRIPTION

A heat installation according to the invention comprises a unit producing heat-generating energy, a regenerator, a circulation device. It may also comprise a heat-generating energy consumer and/or a cavity.

Unit Producing Heat-Generating Energy

The unit producing heat-generating energy may be designed to produce heat-generating energy, for example a furnace or a solar tower.

In one embodiment, the unit producing heat-generating energy comprises a compressor. The compression of a gaseous fluid, preferably adiabatic, causes energy to be stored therein by increasing its pressure and its temperature.

The energy resulting from the pressure increase can be stored by keeping the fluid under pressure. The restoration of this energy may result in expansion, for example in a turbine.

According to the invention, the energy resulting from the increase in temperature is stored in a regenerator. The restoration of this energy then results in a heat exchange with the regenerator.

The heat-generating energy may be a by-product of production, that is to say may not be sought as such.

Preferably, the unit producing heat-generating energy produces more than 50 kW, even more than 100 kW of heat-generating energy, even more than 300 kW, even more than 1 MW, even more than 5 MW. The invention is in fact particularly intended for high-power industrial installations.

Heat-Generating Energy Consumer

The heat-generating energy consumer may be a building or a set of buildings, a tank, a basin, a turbine coupled to an alternator in order to generate electricity, an industrial installation consuming steam, such as, for example, a paper pulp manufacturing installation.

Regenerator

The regenerator is formed, conventionally, by a packed bed of energy storage elements.

A regenerator according to the invention can be manufactured by following a method according to the invention comprising the following steps:

a) producing a starting charge, optionally comprising a red mud;

b) shaping said starting charge in order to obtain a preform, c) optionally, drying said preform, d) sintering the preform
  at a temperature of between 1000° C. and 1500° C., preferably with a dwell time at this temperature greater than 0.5 hour and preferably less than 12 hours, and
  preferably in an oxidizing atmosphere, preferably in air, except if the step a) includes a red mud calcination operation, the atmosphere then preferably being reducing,
so as to obtain an energy storage element,
  e) after manufacture of a plurality of energy storage elements according to the steps a) to d), grouping together said energy storage elements so as to form a packed bed of a regenerator.

If the starting charge comprises a red mud, the step a) may comprise the following operations:
  a1) optionally, drying said red mud,
  a2) optionally, grinding said dried red mud, notably to break up any agglomerates formed in the drying,
  a3) optionally, adding a raw material containing iron oxide to the red mud,
  a4) optionally, calcining at a temperature of
between 900° C. and 1300° C., in a reducing atmosphere, and grinding.

All of the conventional sintering methods can be implemented, provided that the starting charge is suited to the manufacture of energy storage elements suitable for a regenerator according to the invention.

In the step a), a starting charge is prepared.

Preferably, the starting charge comprises a red mud, preferably prepared according to a method comprising the operations a1) to a4).

In the operation a1), optional, said red mud is dried at a temperature preferably of between 100° C. and 500° C., preferably between 200° C. and 350° C. The dwell time at this temperature is preferably between 3 hours and 100 hours.

In the operation a2), optional, the red mud dried in the operation a1) is ground in order to break up the agglomerates which might have formed in the drying operation a1). The grinding can be done in a grinder, or in a lump breaker.

In the operation a3), optional, an iron oxide powder can be added to the red mud, in order to increase the quantity of iron oxide in the mixture.

In the operation a4), optional, the mixture obtained at the end of operation a2) or a3) undergoes a calcination, at a temperature of between 900° C. and 1300° C., for a dwell time at this temperature greater than 0.5 hour, preferably greater than 1 hour and preferably less than 10 hours, even less than 5 hours, in a reducing atmosphere. The calcined mixture can be ground in order to break up the agglomerates which might have formed. The grinding can be done, for example, in a ball mill or in a roll mill.

Preferably, the starting charge comprises more than 10%, preferably more than 30%, preferably more than 50%, preferably more than 60%, preferably more than 70%, preferably more than 80%, as a percentage by weight on the basis of the dry material, of red mud from the manufacture of alumina by the Bayer method, as a percentage by weight on the basis of the dry material. Preferably, the dry material of the red mud is in the form of a powder of particles, of which more than 70%, preferably more than 80%, preferably more than 90% by weight of said particles have a size less than 200 µm. Also preferably, more than 50%, even more than 60% by weight of the particles have a size less than 10 µm.

Preferably, the dry material of the red mud has the following chemical analysis:

25%<$Fe_2O_3$<70%, preferably $Fe_2O_3$<65%, even $Fe_2O_3$<60% and/or preferably $Fe_2O_3$>30%, preferably $Fe_2O_3$>35%, preferably $Fe_2O_3$>40%, even $Fe_2O_3$>45%, even $Fe_2O_3$>50%, and
5%<$Al_2O_3$<30%, preferably <20%, and
$CaO$<20%, and
$TiO_2$<25%, preferably <20%, preferably <15%, and
3%<$SiO_2$<50%, preferably <40%, preferably <30%, preferably <20%, preferably <15%, and
$Na_2O$<10%, even less than 5%, and
$Fe_2O_3+Al_2O_3+CaO+TiO_2+SiO_2+Na_2O$>80%, preferably >85%, even >90%, even >95%, and Other compounds: complement to 100%.

Preferably, the dry material of the starting charge consists for more than 90%, preferably for more than 95%, preferably for more than 99%, of oxides.

In one embodiment, the starting charge contains a powder containing more than 90% by weight of silica, preferably a silica fume powder. The quantity of silica as % by weight on the basis of the dry starting charge, without the additives, is preferably greater than 2%, preferably greater than 3%, even greater than 5% and less than 10%.

In one embodiment, the starting charge contains an alumina silicate powder, notably a clay and/or a kaolin and/or a sillimanite, preferably containing a content by weight of alumina of between 25% and 65%, preferably between 30% and 65%, preferably a clay powder. The quantity of alumina silicate powder, in particular of clay powder, as % by weight on the basis of the dry starting charge, is preferably greater than 5%, preferably greater than 10%, even greater than 15% and less than 40%, even less than 30%. Advantageously, the clay may also be used as shaping additive.

In one embodiment, the starting charge comprises a powder comprising more than 70%, even more than 75% of iron oxide $Fe_2O_3$. In one embodiment, the complement to $Fe_2O_3$ in said powder consists of $Al_2O_3$, $SiO_2$ and, optionally, preferably for less than 10% by weight of said powder, other oxides.

In a preferred embodiment a powder is added to the starting charge, which powder comprises more than 70%, even more than 75% of iron oxide $Fe_2O_3$ and an alumina silicate powder, notably a clay and/or a kaolin and/or a sillimanite, preferably containing a content by weight of alumina of between 25% and 65%, preferably between 30% and 65%, preferably a clay powder. The quantity of alumina silicate powder, in particular of clay powder, as a percentage by weight on the basis of the dry starting charge, is preferably greater than 5%, preferably greater than 10%, even greater than 15% and less than 40%, even less than 30%. Advantageously, the clay may also be used as shaping additive. In one embodiment, the starting charge consists of a mixture of said powder comprising $Fe_2O_3$ and said alumina silicate powder.

The Andréasen or Fuller-Bolomey compaction models can be used to adapt the granulometric distribution to the apparent density of the manufactured energy storage element. Such compaction models are notably described in the work entitled "Traité de céramiques et matériaux minéraux" [Treatise on ceramics and mineral materials], C. A. Jouenne, Editions Septima. Paris (1984), pages 403 to 405.

The starting charge may also contain more than 0.1% by weight of a shaping additive.

The additive may in particular be chosen from the group consisting of:
  clays;
  plastifiers, such as polyethylene glycols (or PEG) or polyvinyl alcohol (or PVA);

the binders, including the organic temporary binders such as resins, lignosulphonates, carboxymethyl cellulose or dextrin;

the deflocculants, such as alkali metal polyphosphates, alkali metal polyacrylates, polycarboxylates; and mixtures of these products.

Preferably, the shaping additive is chosen from the group consisting of clays, lignosulphates, PVA, PEG and their mixtures.

Preferably, the content of shaping additive is less than 6%, as a percentage by weight on the basis of the starting charge, except with regard to clay.

The quantity of water is dependent on the following steps. It is generally between 0 and 20%, as a percentage by weight on the basis of the starting charge without the additives.

In the step b), the shaping can be done by different techniques, including cold pressing, barbotine casting, plastic paste pressing, granulation and extrusion.

In the case of shaping by cold pressing, an addition of a quantity of water of between 1.5% and 4%, as a percentage by weight on the basis of the starting charge without the additives, is preferred, particularly if the red mud has been dried in an operation a1) and/or calcined in an operation a4). In the case of a shaping operation involving extrusion, an addition of a quantity of water of between 10% and 20%, as a percentage by weight on the basis of the starting charge without the additives, is preferred, particularly if the red mud has been dried in an operation a1) and/or calcined in an operation a4). In one embodiment, the quantity of water contained in the red mud used in step a) is sufficient to allow for a shaping, for example by extrusion, without having to add an extra quantity of water.

A drying can be done in an optional step c).

Preferably, the drying is done at a temperature of between 100° C. and 600° C., preferably between 200° C. and 350° C. The dwell time at this temperature is preferably between 3 hours and 100 hours.

In the step d), the preform is sintered. The sintering conditions, and in particular the sintering temperature, depend on the composition of the starting charge. Usually, a sintering temperature of between 1000° C. and 1500° C., preferably of between 1100° C. and 1300° C., is well suited. Preferably, the sintering is done in a reducing atmosphere if the method includes a step a4). If said method does not include the optional step a4), the sintering is preferably done in an oxidizing atmosphere, preferably in air.

On completion of the step d), an energy storage element is obtained.

The energy storage element may undergo a finishing operation in an optional step, notably chosen from a grinding, sawing, surfacing, drilling, machining, in order to adapt it to the geometry of the regenerator. These operations can be done according to all techniques known to those skilled in the art.

The method described above is not limiting.

The shapes and the dimensions of the energy storage elements are not limiting. Preferably, however, the smallest dimension of an energy storage element is greater than 0.5 mm, even greater than 1 mm, even greater than 5 mm, even greater than 1 cm and/or preferably less than 50 cm, preferably less than 25 cm, preferably less than 20 cm, preferably less than 15 cm. Preferably the greatest dimension of a storage element is less than 10 meters, preferably less than 5 meters, preferably less than 1 meter.

The energy storage elements may notably take the form of balls and/or granules and/or solid bricks and/or openwork bricks, and/or cruciform elements and/or double cruciform elements and/or solid elements and/or openwork elements such as those described in U.S. Pat. No. 6,889,963 and/or described in U.S. Pat. No. 6,699,562.

In the step e), said energy storage elements are grouped together to form a packed bed.

The packed bed may be organized, for example by matching energy storage elements, or be disorganized ("bulk"). For example, the packed bed may take the form of a mass of ground pieces (with no particular shape, like a mass of pebbles).

The height of the packed bed is preferably greater than 5 m, preferably greater than 15 m, preferably greater than 25 m, even greater than 35 m, even greater than 50 m.

The weight of the packed bed is preferably greater than 700 T, preferably greater than 2000 T, preferably greater than 4000 T, preferably greater than 5000 T, preferably greater than 7000 T.

Preferably, the energy storage elements are grouped together in a chamber comprising first and second openings intended for the introduction and extraction of a heat-transfer fluid into and from said chamber, respectively.

In one embodiment, the opening of the regenerator through which the charge heat-transfer fluid enters into the regenerator in a charge phase is that through which the reheated discharge heat-transfer fluid leaves the regenerator in a discharge phase. Conversely, the opening of the regenerator through which discharge heat-transfer fluid to be reheated enters into the regenerator in a discharge phase is that through which cooled charge heat-transfer fluid leaves the regenerator in a charge phase.

Preferably, the opening of the regenerator through which the reheated discharge heat-transfer fluid intended for a furnace leaves the regenerator is in the top part of the regenerator.

Preferably, the opening of the regenerator through which the discharge heat-transfer fluids to be reheated enters into the regenerator is in the bottom part of the regenerator.

Circulation Device

The circulation device conventionally comprises a set of pipes, valves and pumps/fans/extractors controlled in such a way as to be able to selectively connect the regenerator to the unit producing heat-generating energy so that it can receive a charge heat-generating fluid leaving said unit, during the charge phases, and to the heat-generating energy consumer so that the reheated discharge heat-transfer fluid leaving the regenerator can reheat said consumer, or more generally transfer heat-generating energy to said consumer, during the discharge phases, and so as to be able to force the circulation of the charge heat-transfer fluid and/or of the discharge heat-transfer fluid through the regenerator.

Heat-Transfer Fluids

The charge and discharge heat-transfer fluids may or may not be of the same nature.

The heat-transfer fluid implemented for the charge and/or the discharge of the regenerator may be a gas, for example air, steam, or a heat-transfer gas, or be a liquid, for example water or a heat oil.

Cavity

Preferably, in particular when the charge- and discharge heat-transfer fluids are of the same nature and when the heat-transfer fluid has undergone a pressure increase, such as air compressed for example to 50 bar, even 100 bar, even 150 bar, the heat installation may comprise a chamber, called "cavity", for temporarily storing the charge heat-transfer fluid, cooled on leaving the regenerator. The volume of the cavity is typically greater than 20 000 m$^3$, even greater than 100 000 m$^3$.

The cavity is preferably slightly permeable, or even tight to the heat-transfer fluid.

Preferably, the heat installation is configured to be able to operate according to at least some, preferably all, of the rules described below.

Operation

During the charge, the charge heat-transfer fluid enters into the regenerator at a temperature of Tc, preferably substantially constant, generally through the top part of the regenerator. Conventionally, in steady-state operation, the difference between the temperature of the heat-transfer Tc and the temperature of the energy storage elements with which it then comes into contact ($T_1$) is 15% to 20% of Tc (or approximately 90° C. to 120° C.), and the heat-transfer fluid is rapidly cooled to the latter temperature.

Preferably, the temperature Tc at which the charge heat-transfer fluid enters into the regenerator during its charge is less than 1000° C., even less than 800° C. and/or preferably greater than 350° C., even greater 500° C.

The charge heat-transfer fluid then continues its path in the regenerator, by reheating the energy storage elements with which it is in contact. Its temperature therefore drops progressively, as represented in the curve $C_i$ of FIG. 1, to the temperature $Tc_i'$.

Preferably, the temperature $Tc_i'$ at which the charge heat-transfer fluid leaves the regenerator, at the start of charge, is close to the discharge temperature of the preceding cycle.

The curve of the trend of the temperature of the charge heat-transfer fluid along its path in the regenerator depends notably on the material of the energy storage elements and on the geometry of the regenerator. It changes over time during the charge phase, through the reheating of the energy storage elements (displacement of the curve $C_i$ towards the curve $C_f$).

In steady-state operation, the curves $C_i$ and $C_f$ are substantially identical from one charge phase to the next.

When the charge heat-transfer fluid is a gas, its cooling may lead to a condensation on the surface of the energy storage elements, in particular in sensible heat regenerators.

At high temperature, such as those envisaged above in particular, the condensates may be very corrosive. As the examples below show, the energy storage elements of a regenerator according to the invention are advantageously very good at withstanding the corrosion by these condensates.

In the discharge, the discharge heat-transfer fluid enters into the regenerator at temperature Td that is preferably substantially constant, generally through the bottom part of the regenerator. Conventionally, in steady-state operation, the temperature Td is close to the temperature of the energy storage elements with which it then comes into contact ($T_2$) and the heat-transfer fluid is reheated rapidly to the latter temperature.

The heat-transfer fluid then continues its path in the regenerator, cooling the energy storage elements with which it is in contact. Its temperature therefore increases progressively, as represented in the curve $D_i$ of FIG. 2, to the temperature $Td_i'$.

The curve of the trend of the temperature of the discharge heat-transfer fluid along its path in the regenerator also depends notably on the material of the energy storage elements and on the geometry of the regenerator. It changes over time, because of the cooling of the energy storage elements (displacement of the curve $D_i$ towards the curve $D_f$).

In steady-state operation, the curves $D_i$ and $D_f$ are substantially identical from one discharge phase to the next.

The regenerator therefore undergoes a succession of "cycles", each cycle comprising a charge phase, possibly a waiting phase, then a discharge phase.

The cycle may be regular or irregular. Preferably it is regular, the duration of the first phases being identical to that of the second phases.

The duration of a regular cycle is generally greater than 0.5 hour, even greater than two hours and/or less than 48 hours, even less than 24 hours.

PARTICULAR EMBODIMENTS

FIGS. 3a and 3b, 4a and 4b, 5a and 5b represent different advantageous embodiments. In all of these embodiments, a heat installation 10 according to the invention comprises a unit producing heat-generating energy 12, a regenerator 14, a heat-generating energy consumer 16 and a circulation device 18. It may also comprise a cavity 20, natural or artificial.

The circulation device 18 comprises a charge circuit 22 and a discharge circuit 24 through which circulate a charge heat-transfer fluid and a discharge heat-transfer fluid, respectively. These charge 22 and discharge 24 circuits make it possible to create a heat exchange connection between the unit producing heat-generating energy 12 and the regenerator 14 during the charge phase, and the regenerator 14 and the heat-generating energy consumer 16 during the discharge phase, respectively.

FIGS. 3a and 3b represent a first particular embodiment in which the heat-generating energy consumer 16 comprises a heat exchanger 26 suitable for ensuring a heat exchange between discharge heat-transfer fluid originating from the regenerator 14 (FIG. 3b) and a secondary heat-transfer fluid circulating in a secondary circuit 28. The secondary circuit 28 is configured to allow a heat exchange connection from the heat exchanger 26 to, for example, a building 30.

The heat installation 10 also comprises a direct heating circuit 32 allowing a direct heat exchange connection from the unit producing heat-generating energy 12, for example a solar tower, and the heat-generating energy consumer 16 during the charge phase (FIG. 3a).

In this embodiment, the regenerator 14 is preferably in proximity to the unit producing heat-generating energy, for example at less than 500 meters, even at less than 250 meters from this unit.

FIGS. 4a and 4b represent a second particular embodiment in which the unit producing heat-generating energy 12 comprises a compressor 34 driven by the energy, for example mechanical or electrical, produced by a generator set 36.

The charge heat-transfer fluid, conventionally air, is therefore compressed and is reheated by its passage through the compressor 34 before arriving, via the charge circuit 22, in the regenerator 14.

The regenerator need not be in proximity to the installation which generates the electricity needed for the compression of the air or the compressor 34.

At the output of the regenerator, the compressed, cooled charge heat-transfer fluid is stored in the cavity 20.

During the discharge, the compressed discharge heat-transfer fluid (that is to say the charge heat-transfer fluid which was stored in the cavity) leaves the cavity 20, is reheated through the regenerator then passes through a gas turbine 38. The gas turbine 38 may drive an alternator (not represented) in order to generate electricity, for example sent into the domestic mains network.

The reheating enables the discharge heat-transfer fluid to accumulate heat-generating energy therein. This energy, restored upon expansion, improves the efficiency of the turbine 38.

The turbine 38 therefore serves simultaneously as consumer of heat-generating energy (reducing the temperature) and as mechanical energy consumer (reducing the pressure).

The embodiment of FIGS. 4a and 4b is particularly well suited to installations which are not designed to generate heat-generating energy, such as a wind turbine factory or an electricity power plant of the hydroelectric or tidal power type.

Such an installation is conventionally called "adiabatic compression energy storage installation". FR 2 947 015 describes an installation of this type.

FIGS. 5a and 5b represent a variant of the second particular embodiment. The heat installation 10 comprises, in addition to the elements of the second embodiment, a second regenerator 14' and, in a second charge circuit 22' of the second regenerator 14', upstream of the second regenerator 14' (following the direction of flow of the charge heat-transfer fluid), a second compressor 34' and, in a second discharge circuit 24', downstream of the second regenerator 14' (following the direction of flow of the discharge heat-transfer fluid), a second gas turbine 38'.

The second regenerator 14', second charge circuit 22', second charge circuit 24', second compressor 34' and second gas turbine 38' operate like the regenerator 14, the charge circuit 22, the discharge circuit 24, the compressor 34 and the gas turbine 38. With the regenerator 14, acting as a unit producing heat-generating energy, they constitute a heat installation according to the invention.

Preferably, the compressor 34 is a medium-pressure compressor and the compressor 34' is a high-pressure compressor.

A number of heat installations according to the invention can thus be arranged in series.

Figure 6:
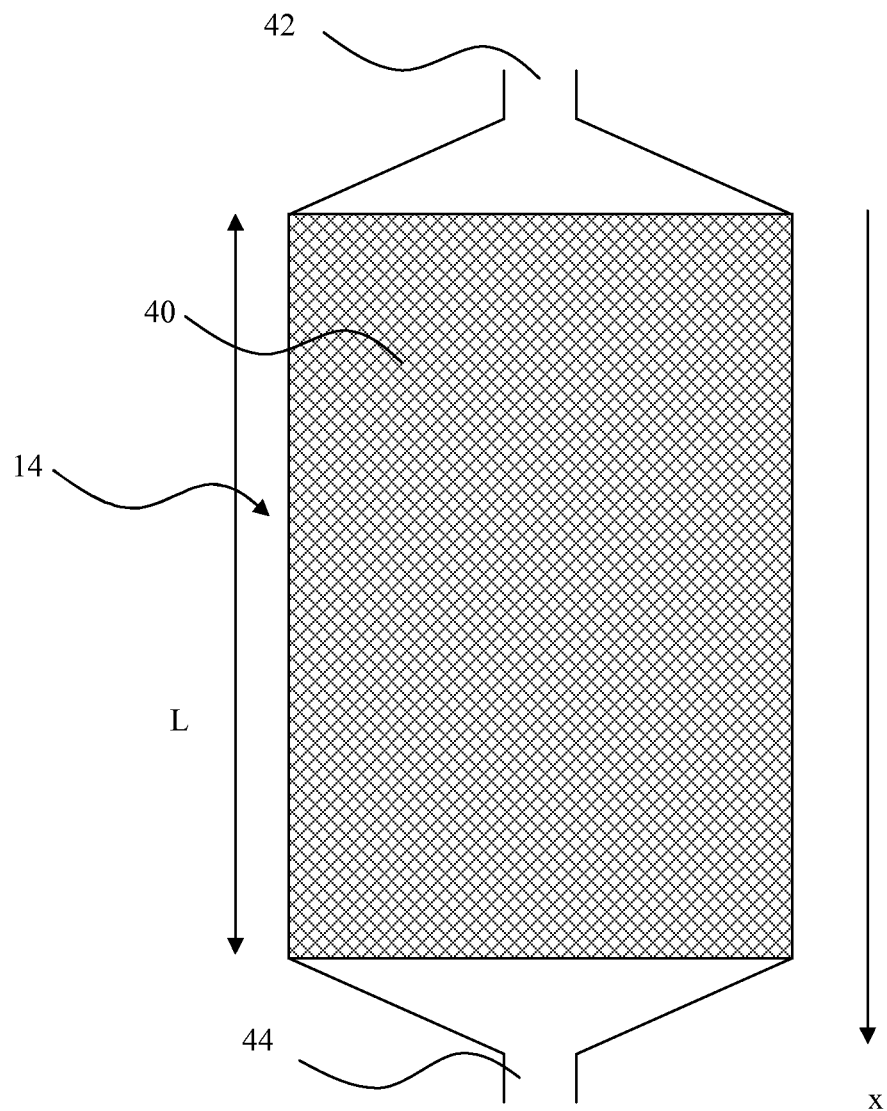
FIG. 6 schematically represents a regenerator.
Figure 7A:
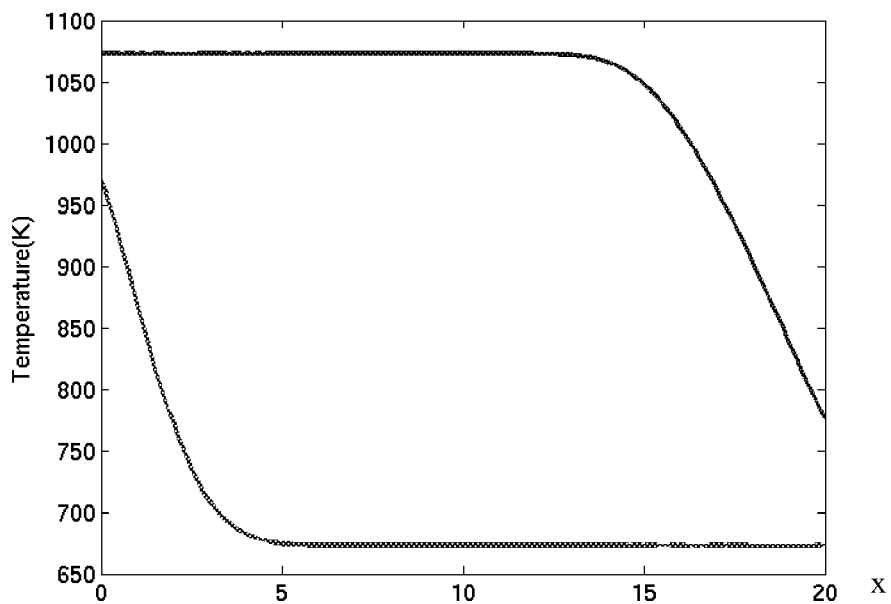
FIGS. 7a and 7b represent the trend of the temperature of the storage elements made of a material according to example 1 and according to example 2, respectively, arranged on the axis of the cylinder of the regenerator, in steady-state operation, according to the position on said axis ("axial position"). The axial position, in meters, is given on the x-axis and the temperature of the charge and discharge heat-transfer fluid, in this case air, on the y-axis, in Kelvin.
Figure 7B:
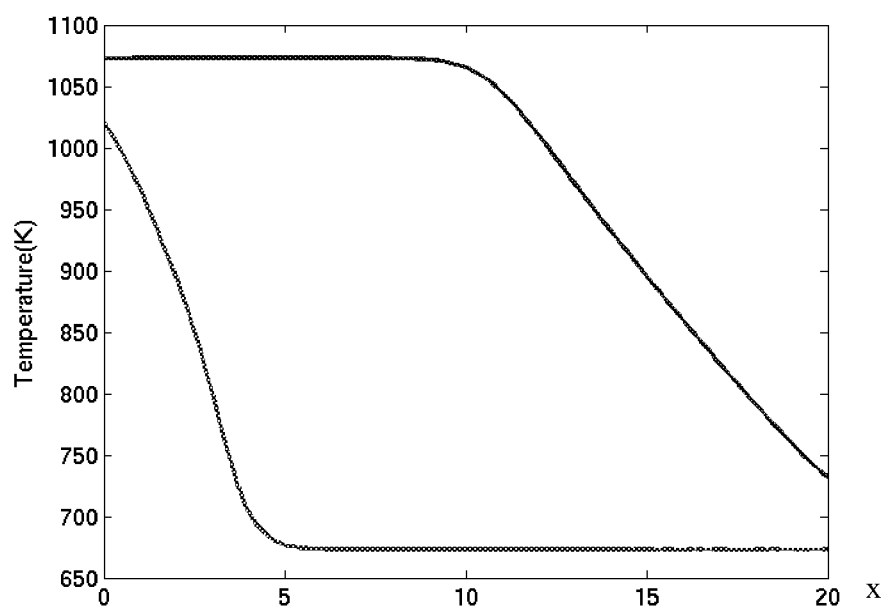

FIG. 6 represents an example of a regenerator 14. This regenerator comprises a packed bed of energy storage elements 40, a top opening 42 and a bottom opening 44 through which the charge and discharge heat-transfer fluids, respectively, enter into the regenerator. The charge and discharge heat-transfer fluids leave the regenerator 14 through the bottom 42 and top 44 openings, respectively.

EXAMPLES

The following examples are supplied for the purposes of illustration and are nonlimiting.

The shape of the energy storage elements is similar for examples 1, 2, 3 and 4.

The energy storage elements according to the example 2 have been produced as follows.

In the step a), the starting charge consists entirely of a red mud, having the following chemical analysis, on the basis of the dry material of said red mud: $Fe_2O_3$=55%, $Al_2O_3$=16%, CaO=5%, $TiO_2$=11%, $SiO_2$=8%, $Na_2O$=4%, other=1%, and of which more than 60% by weight of the particles have a size less than 10 μm. Said starting charge contains no additive.

The shaping of said starting charge, in order to obtain preforms with a length equal to 11 mm and a diameter equal to 16 mm, is produced by uniaxial pressing at a pressure of 125 MPa.

The preforms are then dried for 12 hours at 120° C.

The preforms are then sintered in air, in the following cycle:
raise to 1200° C. at a speed of 100° C./h,
level for 3 hours at 1200° C.,
lower at a speed of 100° C./h.

The energy storage elements according to the example 3, respectively according to the example 4, have been produced as follows.

In the step a), the starting charge consists entirely of 20%, respectively 40%, by weight of a clay powder having a content of $Al_2O_3$ equal to 27%, a content of $SiO_2$ equal to 65% and 8% other compounds, and of 80%, respectively 60%, by weight of an iron oxide powder having a content of $Fe_2O_3$ equal to 78.7%, a content of $SiO_2$ equal to 9%, a content of $Al_2O_3$ equal to 2.9%, and a content of MgO equal to 1.1%. Said starting charge contains no additive.

The shaping of said starting charge, in order to obtain preforms with a length equal to 11 mm and a diameter equal to 16 mm, is done by uniaxial pressing at a pressure of 125 MPa.

The preforms are then dried for 12 hours at 120° C.

The preforms are then sintered in air, in the following cycle:
raise to 1200° C. at a speed of 100° C./h,
level for 3 hours at 1200° C.,
lower at a speed of 100° C./h.

The apparent density and the open porosity have been measured according to the standard ISO5017, after sintering for the examples 2, 3 and 4. The chemical analyses have been performed by X fluorescence.

The resistance to acid water has been measured by the following method:

The product to be tested is ground, and the fraction of between 0.3 mm and 1 mm is retained for analysis. 3 grams of this granulometric fraction are introduced into a Teflon vessel with a capacity of 180 ml containing 100 ml of ionized water, the resistance of which is greater than 16 M ohms, acidified to pH 3 by sulphuric acid.

The vessel is hermetically sealed by screw covers and is placed in a heating block temperature-regulated at 110° C., for 24 hours.

The vessel is then removed from the heating block and cooled in ambient air.

The aqueous solution is collected, separated through a membrane filter made of cellulose acetate having pores with a diameter equal to 0.1 μm. The contents of leached elements in this solution, expressed in an oxide form and in mg/l, are analyzed by plasma torch spectrometry, or ICP standing for "Inductively Coupled Plasma". Thus, for the inventors, the smaller the total quantity of elements found in the acid solution, the greater the resistance of the product tested to acid water.

The following assumptions were used to perform the calculations of the heat-generating energy restored by the regenerator and the temperature of the air at the end of discharge at the output of the regenerator:

One-dimensional model:
heat flow and heat transfer by forced convection in the porous medium, the void fraction being taken as equal to 40%, and the effect of gravity being disregarded,
constant fluid temperature and velocity in a section of the regenerator,
the heat losses and the influence of the wall on the flow are disregarded,
uniform distribution of the temperature and flow of fluid on the upper face (at the time of charge) and on the lower face (at the time of discharge) of the regenerator,
cylindrical regenerator, of constant section, with a diameter equal to 5 m and length L equal to 20 m, heat-transfer fluid: dry air,
constant volume of storage elements,
no radial heat losses,
charge temperature 800° C., or 1073 K,
discharge temperature 400° C., or 673 K,
internal pressure equal to 20 bar,
in charge and in discharge, the flow rate of fluid is constant and equal to 35 kg/s,
duration of the charge: 4 hours,
duration of the discharge: 4 hours.

The following formula gives the quantity of heat-generating energy restored by the regenerator:

$$\int_0^L \int_{Ti}^{Tf} \rho \cdot S \cdot Cp(T) \cdot dT \cdot dx$$

In this formula:
Ti: start-of-charge temperature in the section of width dx, located at the axial position x, in Kelvin,
Tf: end-of-discharge temperature in the section of width dx, located in the axial position x, in Kelvin,
$\rho$: apparent density of the packed bed, in kg/m$^3$,
S: circular section of the regenerator in m$^2$,
L: length of the regenerator in m,
Cp(T): heat-generating capacity of the storage material at the temperature T.

The analyses performed on the storage elements and the results of the calculations made are given in Table 1 below:

As the results indicated in table 1 show, after contact at 110° C. for 24 hours with acid water at a pH equal to 3, the total quantity of leached elements measured in said acid water is less for the energy storage elements of examples 2, 3 and 4 according to the invention. The resistance to acid water of the energy storage elements of examples 2, 3 and 4 according to the invention is greater than that of the energy storage elements of example 1 which is non-inventive. The life of a regenerator containing energy storage elements of the examples 2, 3 and 4 according to the invention will therefore be improved thereby in an acid environment.

Moreover, the efficiency of a regenerator is closely dependent on its geometry and on the material of the energy storage elements implemented to accumulate and restore the heat-generating energy. The inventors have found that a regenerator according to the invention makes it possible to obtain a temperature of the heat-transfer fluid at the output of the regenerator during the discharge, for the same volume of energy storage elements, greater than that which can be obtained with a non-inventive regenerator.

Table 1 in fact shows that the regenerator containing energy storage elements of the example 2, 3 or 4 according to the invention exhibits an end-of-discharge temperature equal to 711° C., 734° C. and 712° C. respectively, greater than the end-of-discharge temperature of the regenerator containing storage elements of the non-inventive example 1 (657° C.). The performance levels of an air-powered turbine at the output of the regenerator containing storage elements of the example 2, 3 or 4 according to the invention are therefore superior to those of a regenerator containing storage elements of the example 1.

TABLE 1

|   | Example 1: Granite storage elements (non-inventive) | Example 2: Storage elements made of a product according to the invention | Example 3: Storage elements made of a product according to the invention | Example 4: Storage elements made of a product according to the invention |
|---|---|---|---|---|
| Chemical analysis of the storage elements of the regenerator | | | | |
| % iron oxide expressed in the form Fe$_2$O$_3$ | 4 | 55 | 61.3 | 48 |
| % Al$_2$O$_3$ | 8 | 16 | 6.7 | 11 |
| % CaO | 5 | 5 | 0.7 | 0.8 |
| % TiO$_2$ | — | 11 | 0.5 | 0.5 |
| % SiO$_2$ | 70 | 8 | 28.8 | 36 |
| % Na$_2$O | 2 | 4 | — | 1.4 |
| % other compounds | 11 | 1 | 2 | 2.3 |
| Other characteristics of the storage elements of the regenerator | | | | |
| Apparent density of the material of the storage elements (gr/cm$^3$) | 2.6 | 3.3 | 3.5 | 3 |
| Open porosity (%) | 2 | 21 | 0.6 | 1 |
| Cp at 25° C. (J kg$^{-1}$ K$^{-1}$) | 800 | 700 | 900 | 875 |
| Results | | | | |
| Heat-generating energy restored by the regenerator (GJ) | 222 | 225 | 226 | 222 |
| Temperature of the air at the end of discharge, at the output of the regenerator (° C.) | 657 | 711 | 734 | 712 |
| Resistance to acid water at 110° C. for 24 hours: total concentration of leached elements, expressed in an oxide form (mg/l) | 19.85 | 4.40 | 4.51 | 4.34 |

This benefit is all the greater since the environmental regulations and the desire to control expenditure are constantly urging the industries to find more energy savings.

Obviously, the present invention is not limited to the embodiments described and represented, supplied as examples. In particular, combinations of the different embodiments described or represented also fall within the context of the invention.

Nor is the invention limited by the shape or the dimensions of the regenerator.

Finally, the energy storage elements may be in contact with a neutral or basic environment.

The invention claimed is:

1. Heat installation comprising a unit producing heat-generating energy and a regenerator, a heat-transfer fluid ensuring a heat exchange between said unit and said regenerator, the regenerator comprising a packed bed of energy storage elements made of a material having the following chemical analysis, as percentages by weight:
   $25\% < Fe_2O_3 < 90\%$,
   $5\% < Al_2O_3 < 30\%$,
   $CaO < 20\%$,
   $TiO_2 < 25\%$,
   $3\% < SiO_2 < 50\%$,
   $Na_2O < 10\%$,
   $Fe_2O_3 + Al_2O_3 + CaO + TiO_2 + SiO_2 + Na_2O > 80\%$, and
   other compounds: complement to 100%.

2. Heat installation according to claim 1, in which heat-transfer fluid from said unit producing heat-generating energy is condensed in said regenerator in the form of an acid liquid.

3. Heat installation according to claim 1, in which the temperature of the heat-transfer fluid from said unit entering into the regenerator is less than 1000° C. and greater than 350° C.

4. Heat installation according to claim 1, in which said temperature is less than 800° C. and greater than 500° C.

5. Heat installation according to claim 1, in which the unit producing heat-generating energy comprises a compressor.

6. Heat installation according to claim 1, comprising
   a heat-generating energy consumer, and
   a circulation device ensuring
     during a charge phase, the circulation of a charge heat-transfer fluid from the unit producing heat-generating energy to the regenerator, then through said regenerator, and
     during a discharge phase, a circulation of a discharge heat-transfer fluid through said regenerator then from said regenerator to the heat-generating energy consumer.

7. Heat installation according to claim 6, in which the heat-generating energy consumer comprises a turbine.

8. Heat installation according to claim 1, in which said material has the following chemical analysis, as percentages by weight:
   $25\% < Fe_2O_3 < 70\%$,
   $5\% < Al_2O_3 < 30\%$,
   $CaO < 20\%$,
   $TiO_2 < 25\%$,
   $3\% < SiO_2 < 50\%$,
   $Na_2O < 10\%$,
   $Fe_2O_3 + Al_2O_3 + CaO + TiO_2 + Na_2O > 80\%$, and
   other compounds: complement to 100%.

9. Heat installation according to claim 1, in which said material has a content of iron oxide expressed in the form $Fe_2O_3$ greater than 30%, as a percentage by weight.

10. Heat installation according to claim 9, in which said material has a content of iron oxide expressed in the form $Fe_2O_3$ greater than 50%, as a percentage by weight.

11. Heat installation according to claim 1, in which said material has a content of iron oxide expressed in the form $Fe_2O_3$ less than 80%, as a percentage by weight.

12. Heat installation according to claim 1, in which said material has a content of $Al_2O_3$ less than 25%, as a percentage by weight.

13. Regenerator according to claim 12, in which said material has a content of $Al_2O_3$ less than 20%, as a percentage by weight.

14. Heat installation according to claim 1, in which said material has a content of CaO greater than 3%, as a percentage by weight.

15. Heat installation according to claim 14, in which said material has a content of CaO greater than 10%, as a percentage by weight.

16. Heat installation according to claim 1, in which said material has a content of $TiO_2$ less than 20%, as a percentage by weight.

17. Heat installation according to claim 16, in which said material has a content of $TiO_2$ less than 40%, as a percentage by weight.

18. Heat installation according to claim 1, in which said material has a content of $SiO_2$ less than 40%, as a percentage by weight.

19. Heat installation according to claim 18, in which said material has a content of $SiO_2$ less than 20%, as a percentage by weight.

20. Heat installation according to claim 1, in which said material has a content of $Na_2O$ less than 5%, as a percentage by weight.

21. Heat installation according to claim 1, in which said material has, as a percentage by weight, a content of $Fe_2O_3 + Al_2O_3 + CaO + TiO_2 + SiO_2 + Na_2O > 85\%$.

22. Heat installation according to claim 1, in which said material has, as a percentage by weight, a content of $Fe_2O_3 + Al_2O_3 + SiO_2 > 50\%$.

23. Heat installation according to claim 1, in which said material has, as a percentage by weight, a content of $Fe_2O_3 + Al_2O_3 > 40\%$.

24. Heat installation according to claim 1, in which said material has, as a percentage by weight, a content of $Fe_2O_3 > 45\%$, on the basis of the sum $Fe_2O_3 + Al_2O_3 + SiO_2$.

25. Heat installation according to claim 1, in which more than 90% by weight of the other compounds of said material consist in oxide compounds, as percentages expressed on the basis of the weight of the other compounds.

26. Heat installation according to claim 1, in which said material is a sintered material.

27. Heat installation according to claim 1, in which the energy storage elements are obtained by sintering a preform resulting from the shaping of a starting charge comprising more than 10% of red mud from the production of alumina by the Bayer method, as a percentage by weight on the basis of the dry material of the starting charge.

28. Heat installation according to claim 27, in which said starting charge comprises more than 50% of red mud, as a percentage by weight on the basis of the dry material of the starting charge.

29. Heat installation according to claim 28, in which said starting charge comprises more than 80% of red mud, as a percentage by weight on the basis of the dry material of the starting charge.

30. Heat installation according to claim 1, in which the energy storage elements are obtained by sintering a preform resulting from the shaping of a starting charge consisting of a mixture of a powder comprising more than 70% iron oxide $Fe_2O_3$ and a powder of alumina silicate.

31. Heat installation according to claim 1, in which the weight of the packed bed is greater than 700 tons.

* * * * *